Oct. 4, 1955  E. R. PRICE  2,719,609
TRACTOR-TRAILER BRAKE SYSTEM
Filed Sept. 16, 1952  5 Sheets-Sheet 1

INVENTOR.
EARL R. PRICE
BY
H. O. Clayton
ATTORNEY

Oct. 4, 1955          E. R. PRICE          2,719,609

TRACTOR-TRAILER BRAKE SYSTEM

Filed Sept. 16, 1952          5 Sheets-Sheet 4

INVENTOR.
EARL R. PRICE
BY
H. O. Clayton
ATTORNEY

Oct. 4, 1955   E. R. PRICE   2,719,609
TRACTOR-TRAILER BRAKE SYSTEM
Filed Sept. 16, 1952   5 Sheets-Sheet 5
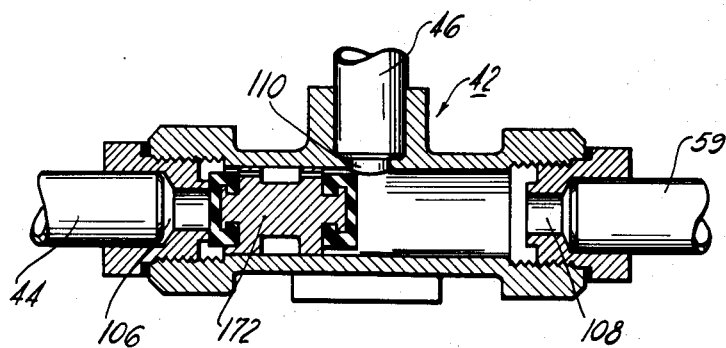
FIG. 6
FIG. 7
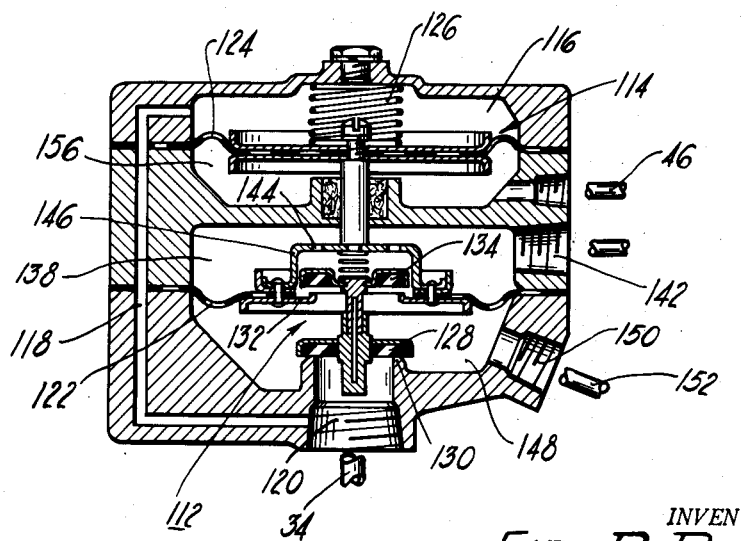
INVENTOR.
EARL R. PRICE
BY
H. O. Clayton
ATTORNEY United States Patent Office 2,719,609
Patented Oct. 4, 1955

2,719,609

TRACTOR-TRAILER BRAKE SYSTEM

Earl R. Price, South Bend, Ind., assignor to Bendix Aviation Corporation, South Bend, Ind., a corporation of Delaware Application September 16, 1952, Serial No. 309,765

14 Claims. (Cl. 188—3)

The present invention relates to a tractor-trailer braking system, and particularly to a system which provides application of the trailer brakes slightly ahead of the tractor brakes without postponing the normal application of the tractor brakes.

The system disclosed herein may be considered as an improvement over that which constitutes the subject matter of my prior copending application Serial No. 214,747, filed March 9, 1951, now U. S. Pat. No. 2,694,468 dated November 16, 1954. An important feature of the system of Serial No. 214,747 is that the degree of advance trailer braking effort may be preselected to meet varying road and vehicle loading conditions. Thereafter, when the usual tractor brake pedal or other manual means is actuated to apply the brakes of the tractor-trailer combination, the trailer brakes are applied with a selected degree of effort ahead of the tractor brakes without postponing the normal application of the latter, the trailer brakes "waiting" until a predetermined ratio between tractor and trailer braking has been reached and then applying according to such ratio.

By employing the system of the instant application, the driver of a tractor-trailer combination may at any time, and by a hand-operated mechanism within easy reach, not only preselect the desired degree of advance braking of the trailer brakes and thereafter carry out the braking operation as in the system of my prior application above noted, but he has the option of controlling the application of the trailer brakes either by hand or foot at any time desired or found necessary.

Accordingly, an object of my invention is to provide a tractor-trailer brake system wherein a certain operation of the trailer brakes may be first preselected and then effected by an operation of either the hand of the driver, or the foot of the driver in his brake pedal operation of the wheel brakes of the vehicle; and the mechanism is subsequently operative, by a continued operation of the brake pedal, to concurrently operate the tractor brakes, and the trailer brakes, this operation of the trailer brakes supplementing the previous certain preliminary operation of said brakes; or the mechanism may, in the alternative, be subsequently operative, by an operation of the hand control valve of the mechanism, to increase the then existing application of the trailer brakes.

Another object of my invention is to provide a tractor-trailer brake system including a control unit comprising a combination hand control valve and advance control valve which can be used as a conventional hand control at any time the driver desires to use it as such. This control unit, which is preferably mounted on the steering post of the vehicle, will permit the driver to increase or decrease the amount of advance trailer braking; and if the driver so desires he can entirely eliminate this advance; all of which can be done by the driver while the vehicle is in motion, Figure 1 is a diagrammatic illustration of an embodiment of the present invention showing a tractor-trailer hook-up;

Figure 6 is a sectional illustration of the transfer valve of Figure 1; and

Figure 7 is a sectional illustration of the conversion valve of Figure 1.

Figure 1:
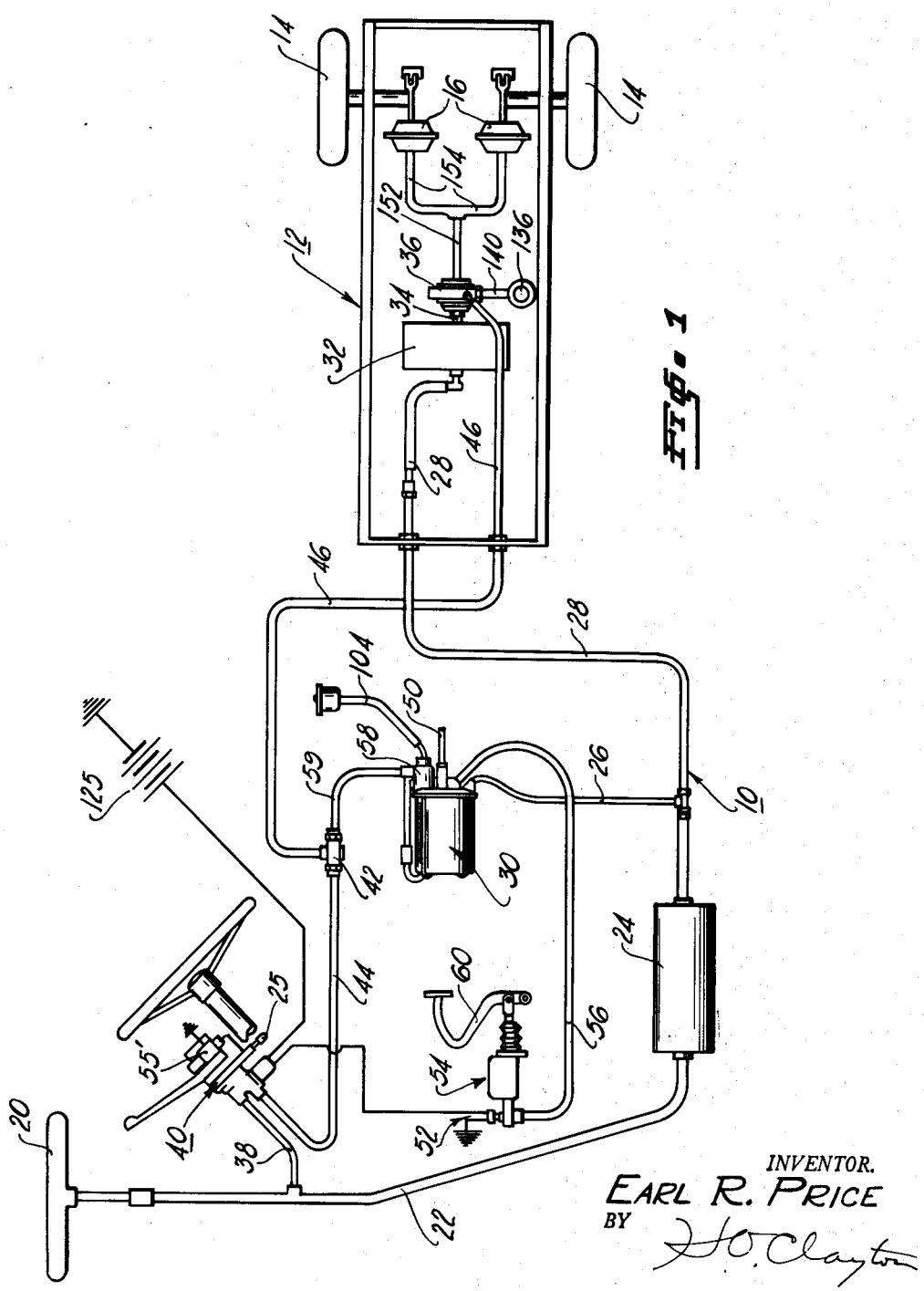

Referring now to the drawings, and more particularly to Figure 1, the reference numeral 10 indicates in general a tractor and the numeral 12 a trailer the latter having rear wheels 14 the brakes of which are preferably actuated by pressure differential operated air suspended cylinders 16 of any well known design.

The tractor 10 includes an internal combustion engine having an intake manifold 20 which is utilized as a source of vacuum for the braking system, and which is connected, by means of a conduit 22, to a vacuum reserve tank 24. This tank 24 has branch conduits 26 and 28 which lead respectively to a tractor brake operating device 30 and a trailer vacuum reserve tank 32. The latter tank is connected, by a conduit 34, to a relay conversion valve 36. The purpose of the valve 36 is to speed up response of the trailer power cylinder 16 to operation of the braking system.

A branch conduit 38 from the vacuum line 22 leads to a combined regulator and advance control valve 40 hereinafter defined as the control valve. The output of control valve 40 is fed into a transfer valve 42 by means of a conduit 44 and the output of the transfer valve is fed through a conduit 46 to the valve 36.

The tractor power device 30 is illustrated as being of the differential air pressure type which, upon actuation, develops a hydraulic pressure which is transmitted by means of a pipe 50 to the tractor brakes, not shown. This power device 30 is actuated by means of a conventional brake pedal and hydraulic master cylinder arrangement generally indicated by the reference numeral 54, the hydraulic output of the master cylinder being fed into the device 30 by means of a pipe 56. This master cylinder output is fed through suitable passages in the device 30 and is utilized to operate a control valve fastened to device 30 and generally indicated by the reference numeral 58. The output of the control valve 58 is fed, by a conduit 59, into one branch of the transfer valve 42 for controlling communication between this valve 58 and the relay valve 36 of the trailer 12.

Figure 3:
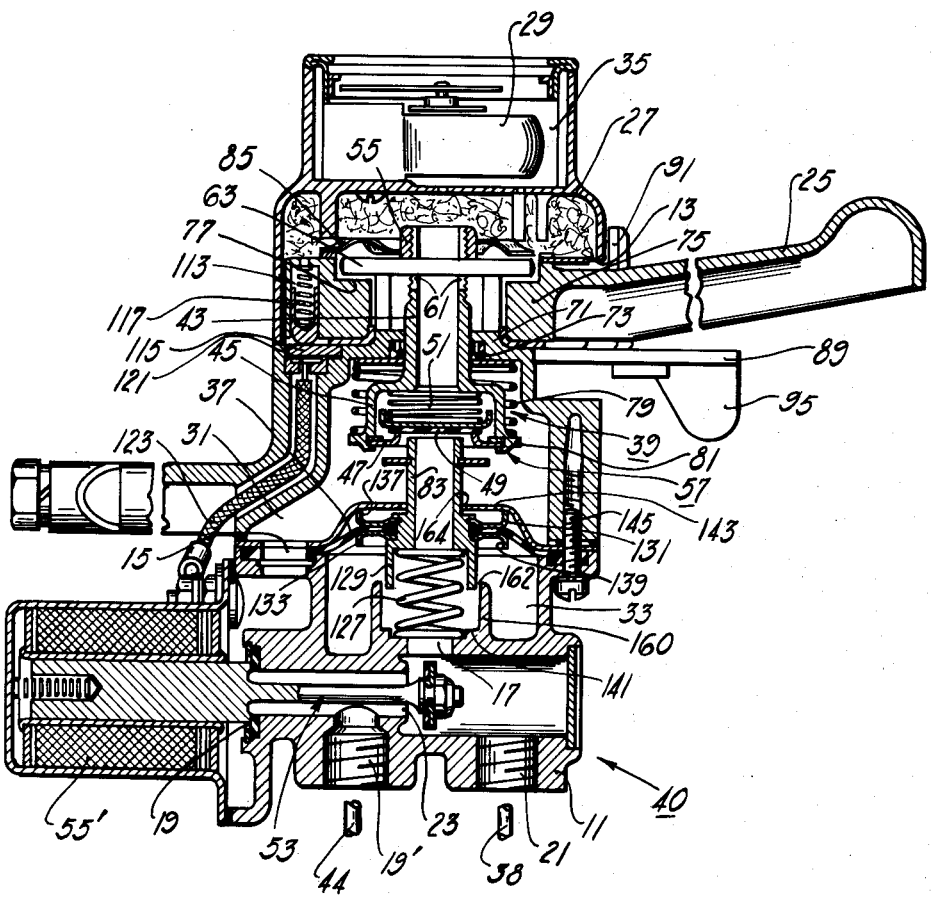
Figure 3 is a sectional illustration of the combined regulator and advance control valve of Figure 1, said valve constituting the principal feature of my invention.

A grounded electrical switch 52 is operatively connected to the brake pedal to control actuation of a three way cut in or better termed advance valve 53, Figure 3, said valve being actuated by means of a solenoid 55'. A manual and power operated three way regulator valve 57 of the control valve unit 40 serves to feed air flow from a chamber 31 to the advance valve 53.

It may be stated at this point that operation of a brake pedal 60 serves to first operate the advance valve 53 for connecting the chamber 41 to said valve to thereby transfer a predetermined air pressure normally built up in said chamber to the trailer brake system and thereby partially apply the trailer brakes. Further depression of the brake pedal 60 serves to operate the control valve 58 which functions to transmit an air pressure to the tractor power device 30 and also to the trailer brake system by way of the transfer valve 42. In order to provide a clear understanding of how the present invention is constructed and how it functions, a description of each of the component parts of the system will now be made.

Figure 2:
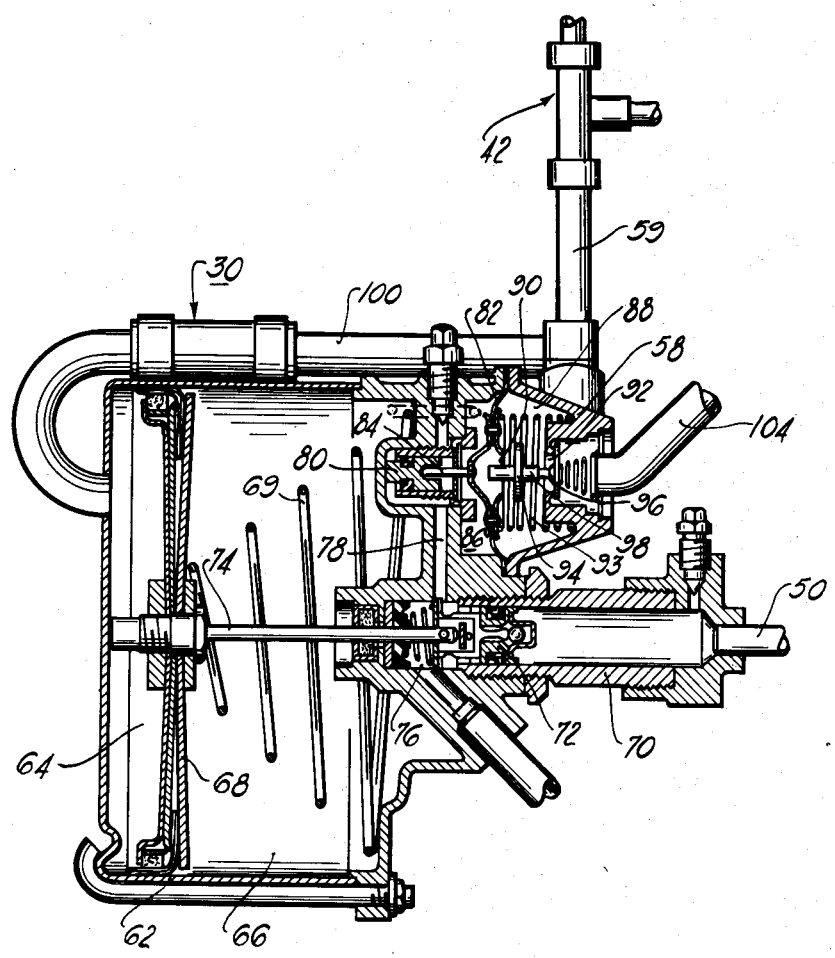
Figure 2 is a sectional illustration of the tractor power device and system control valve of Figure 1.

The power device 30, as shown in Figure 2, comprises a power chamber 62 which is divided into two variable volume chambers 64 and 66 by means of a power piston 68. A frusto-conically shaped spring 69 biases piston 68 to its illustrated, released position. A hydraulic slave cylinder 70 extends substantially co-axially outwardly from the right-hand end of the chamber 62, and reciprocably carries a piston 72 connected to the power piston 68 by means of a push rod 74. Reciprocatory motion of the power piston 68 will be transmitted to slave piston 72, this slave piston 72 serving the purpose of developing hydraulic pressure which is transmitted by means of conduit 50 to the tractor brakes, not shown. The manually operated master cylinder 54 feeds through line 56 into chamber 76 located immediately behind slave piston 72. This chamber 76 is in turn connected by means of a passage 78 to the head end of control valve piston 80 which is in turn connected to a pressure responsive diaphragm 82 by means of a thrust link 84. This diaphragm 82 separates two variable volume chambers 86 and 88, chamber 86 being constantly connected to a vacuum source and power chamber 66, and chamber 88 being connected at times to chamber 86 by means of valve opening 90 in diaphragm 82 and at other times to the atmosphere by means of the port 92. A spring 93 biases diaphragm 82 and piston 80 to the left. Two poppet type valves 94 and 96 control the opening and closing of the two valve ports 90 and 92, respectively, these valves being spaced apart by means of a connecting pin 98. As illustrated, the control valve 58 is in released condition, the valve 96 closing the atmosphere port 92, and valve 94 being spaced from the vacuum port 90 so as to provide vacuum communication between the chamber 86 and 88. A conduit 100 leads from the control chamber 88 to the power chamber 64 so that the power piston 68 is actually submerged in vacuum during brake release. The conduit 59 leads from the control chamber 88 to the transfer valve 42.

The control valve 58 is operated as follows. By depressing the brake pedal 60, liquid pressure is transmitted through conduit 56, and against the head end of piston 80. Diaphragm 82 is forced to the right and vacuum port 90 seats upon and is closed by the valve 94. Continued movement of the diaphragm 82 forces valve 96 off its seat allowing air at atmospheric pressure to enter by means of an air tube 104 through the atmospheric port 92 and into the control chamber 88, from which it passes through the conduits 100 and 59. The air pressure in chamber 64 is thereby increased and acts to move the piston 68 to the right. Slave cylinder piston 72 is accordingly moved to the right and transmits hydraulic pressure to the tractor brakes.

Since the air which enters the control chamber 88 acts against the diaphragm 82 and the vacuum in chamber 86, the diaphragm 82 will be forced to the left allowing spring 93 to move valve 96 to close atmospheric port 92. When this happens, both ports 90 and 92 are closed and the valve is said to be in lapped condition.

The pressure in control chamber 88 is now stabilized, thus stopping the rightward movement of the power piston 68. By further depression of the brake pedal 60, the braking cycle is repeated and additional pressure is introduced into chamber 64 which provides more braking force for the tractor brakes.

Figure 3 illustrates the regulator valve 57 which is identical with the valve illustrated and claimed in Hupp application No. 94,697 filed May 21, 1949, now U. S. Patent No. 2,657,701 dated Nov. 3, 1953. This valve operates in the same manner as it is intended to operate in the aforementioned application No. 94,697, but is used in a slightly different manner which will be described hereafter.

The control valve 40 is provided with a casing 11 having three ports 13, 15 and 17. Port 15 is connected to a port 19 of the cut-in valve 53; port 17 communicates with a vacuum port 21 of the casing 11 and with a port 23 of the valve 53; and port 13 is at all times open to the atmosphere, the air entering the valve 40 around a handle 25 to pass through an air cleaner 27. An oiler mechanism 29 within the air cleaner serves to provide said cleaner with oil to aid in filtering the air passing into the valve 57.

The regulator valve 57 may conveniently be considered as being divided into three chambers, the aforementioned control chamber 31, a vacuum or fluid chamber 33, and an air chamber 35. The control chamber 31 is separated from vacuum chamber by a fluid responsive element or diaphragm 37, preferably fabricated of rubber and suitably fastened to the casing 11. The control and vacuum chambers are operatively sealed from the air chamber 35 by means of the air tube assembly generally indicated by reference numeral 39. Specifically, this assembly is composed of a cylindrical air tube or first pressure conducting member 43 having a flared end 45 to which is secured an inwardly projecting annular flanged valve seat 47. A valve member or poppet 49 is carried inside flared end 45, and is urged into sealing engagement with valve seat 47 by means of a resilient member such as the cylindrical shaped spring 51 which is compressed between the flared portion 45 of tube 43 and valve member 49.

Air tube 43 is provided at its other end with an open adjusting cap or nut 55 and diametric openings or slots 61 which may be varied in size by turning cap 55 for a purpose to be explained hereinafter. It is obvious that any element which can be adjustably moved to vary the size of said openings may be used in place of the specific arrangement of the cap 55. Into openings 61 is inserted a cam follower or pin 63 which is guided for translatory axial movement with respect to the casing 11 in a slot 65 formed in a sleeve 67, Figure 4. This sleeve 67 which surrounds the upper end of tube 43 is preferably fixed in position with respect to casing 11 by being formed integral with the control chamber end wall 71 which surrounds air tube 43 in fluid tight relation by means of a rubber sealing ring 73. Rotatably mounted on casing 11 is a cylindrically shaped cam member 75 having two oppositely disposed complementary cam surfaces 77 which are engaged by the ends of cam follower pin 63. The handle 25 is integral with the member 75. The air tube assembly 39 is at all times urged downwardly by means of a cylindrical compression spring 79 which encircles the lower end of air tube 43 to bear against end wall 71 and radial flange 81 on flared end 45 of the air tube 43. Thus, the upper edges of openings 61 are maintained in engagement with cam follower pin 63 to urge it against the cam surfaces 77. By turning the threaded cap or nut 55 the air tube assembly can be raised or lowered with respect to the mouth of a tube 83; and this constitutes the only adjustment necessary for satisfactory operation of the control valve 57. In assembling this valve, the cap 55 is adjusted to compensate for manufacturing tolerances; thus the necessity for precision machining of parts is eliminated. This feature obviously contributes to the economy of construction and lends itself to simplicity of valve design.

A waved friction spring 85 on the upper annular surface of cam member 75 used in conjunction with the shallow inclination of the cam surfaces 77 prevent the load of spring 79 from turning handle 25 and to require some manual pressure on the handle 25 in an applying direction before the valve may be actuated. A movement of the handle 25 in a clockwise direction will result in a downward movement of the air tube assembly 39 under the load of spring 79 and counter-clockwise movement of the handle will obviously cause this assembly 39 to be raised.

An important feature of my invention lies in the provision of means for controlling the movement of the handle 25 in the control of valve 57; and a further important feature of my invention lies in the means for controlling the operation of the cut-in valve 53. To this end there is provided a stop mechanism including a ring 87, Figure 4, encircling the upper end of the casing 11, said ring being provided with an enlargement 89. A flange 91, Figure 3, extending upwardly from and integral with the enlargement serves, in part, as an abutment or stop for the handle 25; and a downwardly extending ear 95 of said enlargement is contacted by the fingers of the driver's hand in the operation of moving the handle 25 to open the valve 57. This valve is closed by a counter-clockwise movement of the handle, the latter abutting the flange 91 in this operation to move the ring 87 to its valve off position. Stop pins 99 and 101 extending from and secured to the top of the casing 11 serve to limit the arc of movement of the ring 87 and handle 25 mounted thereon. A pawl 103, biased outwardly by a spring 105, serves, together with a ratchet 107, to adjustably determine the setting of the valve 57 and the force necessary to operate said valve; the pawl 103 and cooperating mechanism preferably being so constructed that more force is necessary to open the valve than to close the same. As disclosed in Figure 4, the pawl 103 and spring 105 are housed within a recess 109 in the casing 11; and the ratchet 107 is secured to the underside of the body of the enlargement.

Figure 4:
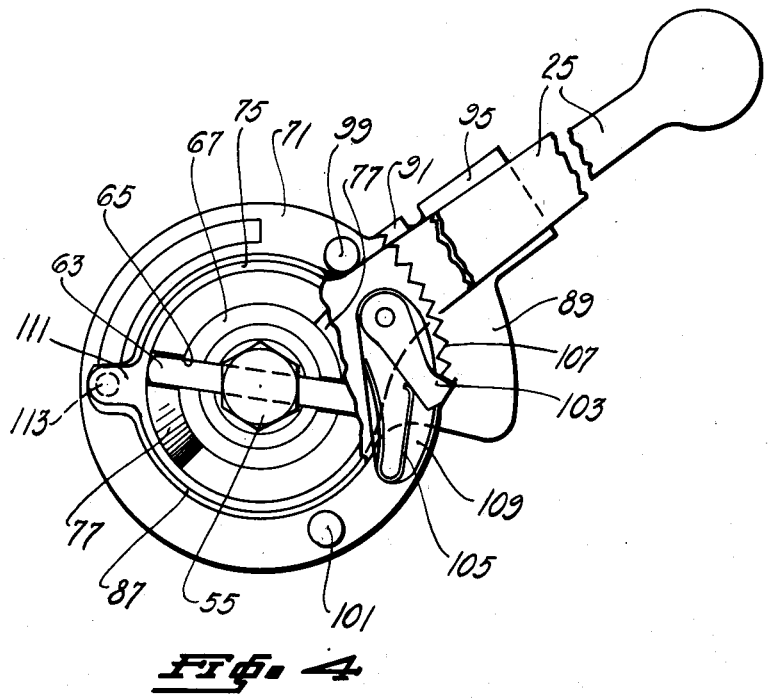
Figure 4 is a top plan view of the valve of Figure 3.
Figure 5:
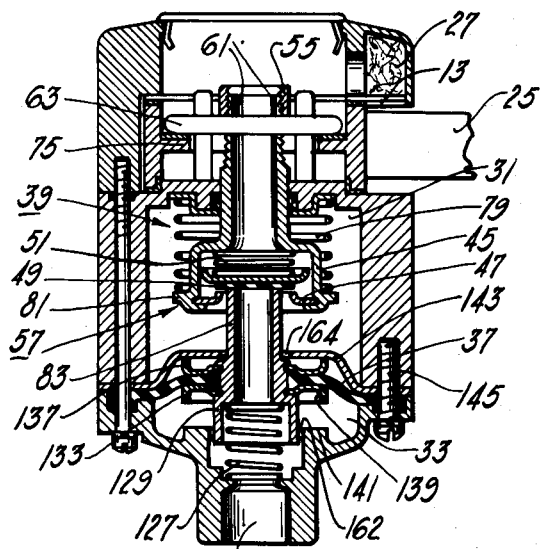
Figure 5 is a view similar to Figure 3 disclosing the regulator valve in its open position and prior to a lapping of said valve.

As to that part of the control valve 40 operative to control the cut-in valve 53, the cam member 75 is provided with a projection 111, Figure 4, recessed to house a spring-pressed grounded switch member 113, Figure 3. When the handle 25 is in contact with the flange 91, the member 113 contacts a projection 115 extending from and secured to the ring 87; however when said handle is moved clockwise away from the flange 91 a spring 117 moves the switch member 113 downwardly into contact with a conductor strip 121, preferably of copper, embedded within the casing 11. This conductor strip is electrically connected, by a conductor 123, to the solenoid 55' which is in turn wired to a grounded battery 125. There is thus provided hand controlled means for energizing the solenoid 55' to open the cut-in valve 53 to effect an operation of the trailer brakes, assuming of course, that the valve 57 is preselected, that is, opened; and in this operation the vacuum connection, via ports 21 and 23, to the vacuum source is closed and a connection to the valve 57 opened via ports 15 and 19. A port 19' of the cut-in valve is connected to the conduit 44; and the port 21 is connected to the source of vacuum by the conduits 38 and 22.

Continuing the description of the valve 40, the lower end of casing 11 is formed with a tubular shaped flange 160 which connects with vacuum port 17 and which houses a compression spring 127 and the enlarged lower end 129 of cylindrical vacuum tube or second fluid pressure conducting member 83, this latter tube being biased upwardly by spring 127 and having its axis coincident with the axes of casing 11 and air tube 43. Diaphragm 37 is sealed to tube 83 intermediate its ends by means of two disk shaped stop and reaction members 131 and 133 which are secured to said tube by any suitable means and which clamp said diaphragm therebetween. The outer peripheries of these stop members 131 and 133 are formed to provide oppositely extending axial flanges 137 and 139, respectively. Flange 139 is adapted to engage a portion 141 of casing 11 upon full valve actuation movement of handle 25, and in released position of said handle 25 flange 137 is adapted to engage the transverse, rigid annular shaped member 143 which is preferably secured in fluid tight relation to casing 11. Preferably, the outer peripheral margin of the member 143 and diaphragm 37 are clamped between sections of the casing and are held together by screws 145.

As can be seen in the drawings, slight clearances are provided between the lower end 129 of vacuum tube 83 and the flange 160, and between the upper end of this tube and annular member 143, these clearances being indicated by reference numerals 162 and 164, respectively. The purpose of these clearances is to provide for restricted fluid communication, the clearance 162 connecting chamber 33 with port 17, and clearance 164 connecting control chamber 31 with the upper side of diaphragm 37. This restricted fluid communication resists the tendency of the present invention to "horn" a phenomenon characterized by the sound of sustained cycling of a pneumatic valve seeking its lapped position.

The parts of the hand controlled regulator valve 57 just described are so proportioned that when said valve is in released position, Figure 3, the valve member 49 rests on annular valve seat 47, while the upper end of vacuum tube 83 is slightly spaced from the valve member 49. In this position, air at atmospheric pressure is confined to the interior of air tube 43. Vacuum connected with port 17 is communicated to the upper side of diaphragm 37 by means of the vacuum tube 83 and through its clearance with valve member 49 and passage 164. Thus in released position, diaphragm 37 is submerged or suspended in vacuum or the pressure to which port 17 might be connected.

For applying the trailer brakes, the control valve 40 operates as follows: see Figures 3 and 4. Depending upon the amount of trailer brake application desired the handle 25 and ring 87 are moved as a unit clockwise, the flange 91 abutting the handle 25 in effecting this operation. Air tube 43 is then moved downwardly under the influence of spring 79 to a point corresponding to a certain point on cam surfaces 77. Valve 49 engages the upper end of vacuum tube 83, and air thereupon flows around said valve, Figure 4, into control chamber 31, through clearance 164 to the upper side of diaphragm 37. The differential of pressure thus created over diaphragm 37 forces the vacuum tube 83 downwardly until the valve is lapped. In this operation of the valve air at atmospheric pressure is dumped into the control chamber 31 and valve 49 is then seated on the seat 47 and on the upper end of the tube 83. Vacuum is thereby cut-off from the control chamber 31, and air is prevented from entering the vacum tube 83 by the valve 49.

Referring to Figure 6, disclosing the details of the transfer valve, this valve is T-shaped, and is provided with three ports, port 106 communicating with conduit 44, port 108 communicating with conduit 59, and port 110 communicating with conduit 46. A shuttle valve 172 reciprocates in the bore, and is arranged to close either the port 106 or the port 108. If the pressure in conduit 44 is below that in conduit 59, the valve 172 will, as disclosed in Figure 6, be moved to close the port 106 whereby only conduits 46 and 59 will be in communication. If the reverse condition is true, that is, the pressure in conduit 59 is less than that in conduit 44, the valve will move to close off port 108, communication thereby being established solely between conduits 46 and 44.

There are disclosed in Figure 7 details of the relay conversion valve 36. This valve, which is disclosed and claimed in the U. S. Patent to Earl R. Price Pat. No. 2,429,196, dated October 14, 1947, includes a three way valve 112 actuated by a spring and pressure differential operated motor 114. A chamber 116 of said motor is connected, via a duct 118, with a port 120 to which is connected the conduit 34 leading to the vacuum tank 32. The sections of a three part valve casing have clamped therebetween flexible members 122 and 124, the latter serving as the power element of the valve operating motor 114. As is disclosed in Figure 7, this power element is biased downwardly by a spring 126 to seat a valve member 128 upon a valve seat 130 and to move a ring 132, secured to the flexible member 122, away from a valve member 134. Air from an air cleaner 136, Figure 1, then passes into a valve chamber 138 via a conduit 140 and a port 142; thence via openings 144 in a cup member 146 secured to the member 132, around the edges of valve member 134, into a valve chamber 148, thence through port 150 and conduits 152 and 154 to the aforementioned two air suspended trailer brake operating motors 16. With the valve in this position, that is, its off or closed position, the motors 16 are deenergized and the trailer brakes are released; and it is to be noted that a chamber 156 of the motor 114 is connected to the control conduit 46 and that this conduit is connected to a source of vacuum when the valve 36 is in its off position.

To apply the trailer brakes air is admitted to the motor chamber 156 via the control line 46, whereupon the member 124 is, by virtue of the differential of pressures acting thereon, moved upwardly to first close off the air vent to the trailer brake motors 16 and then, via the then unseated valve member 128, connect said motors to the vacuum tank 32. The air suspended motors 16 are then energized to apply the trailer brakes. The degree of application of the trailer brakes is dependent upon the amount of air admitted to the control chamber 156; for when the flow of air to said chamber is cut-off and the chamber is reconnected to vacuum, then the members 146, 134 and 128 move downwardly as a unit to cut-off the flow of air from the motors 16, the valve member 128 being seated and the valve 112 closed as disclosed in Figure 7.

Having described the various component parts of the system of the present invention, the operation of this system will now be described.

Under normal running conditions, with the brakes released, vacuum will be communicated to the power device 30 on the tractor. Vacuum will also be communicated through the advance vacuum cut-in valve 53 from which it is carried by means of conduits 44 and 46 to the trailer relay valve 36, or, alternatively, through control valve 58, conduits 59 and 46 to said relay valve depending upon the position of shuttle valve 172 in transfer valve 42. The operator of the tractor-trailer, having judged in advance the amount of advance trailer braking effort he desires for the road conditions being encountered, moves the handle 25 of the regulator valve 57 to a position which he knows from previous teachings or experience will give him the desired braking effect. This operation, of course, is effected by a clockwise rotation of the ring 87, the flange 91 being pushed against the handle 25. When this happens the regulator valve 57 will automatically develop, in the control chamber 31, a pressure which corresponds to the setting of handle 25, and since the advance valve 53 prevents communication between chamber 31 and conduit 44 this chamber will act as a reservoir or storage chamber for this pressure.

Upon initial movement of the pedal 60, switch 52 will be closed and solenoid 55' energized. Valve 53 will then open the passage to the chamber 31 via ports 19, and 15 and close the vacuum port 23, thereby bringing said chamber into communication with conduit 44. The reserve air pressure then flows from chamber 31 of valve 57 to port 106 of transfer valve 42, and since the pressure in conduit 59 is at vacuum level, the valve 172 will be moved to close the port 108. The air pressure then enters conduit 46 by which it is transmitted to relay valve 36. This relay valve operates as described above and causes a differential pressure to be created in the motors 16 to apply the trailer brakes ahead of the tractor brakes. Further depression of the brake pedal develops a hydraulic pressure in the master cylinder which is transmitted by way of line 56 to the control valve 58. Once the control valve 58 is operated, air enters conduits 100 and 59, the increase in pressure in conduit 100 serving to apply the tractor brakes, while the pressure in conduit 59 encounters the closed port 108. When the brake pedal 60 has been depressed sufficiently to operate the control valve 58 to such an extent that the pressure delivered into conduit 59 exceeds that in conduit 44, the shuttle valve 172 will traverse the bore of the valve 42 and close port 106 thereby establishing communication from conduit 59 to conduit 46. It is obvious that when and after this occurs the control valve 58 solely controls the braking pressures delivered to both the power devices 30 and 16, and also destroys the degree of advance braking of the trailer.

For wet or icy pavement conditions, it has been found that the advance braking of the trailer should not be as great as it would be for ideal, dry road conditions. The exact setting of the handle 25 of regulator valve 57 will be largely determined by experience, and will obviously vary with changing road conditions and weight of the vehicle.

It is also to be noted that after the degree of advance braking of the trailer has been preselected by the clockwise movement of the ear 95, this advance braking may then be effected by either moving the handle 25 clockwise with respect to the flange 91 or by slightly depressing the brake pedal 60; for this movement of the handle 25 serves to close the switch 113 thereby energizing the solenoid 55' to open the advance valve 53; and the slight depression of the brake pedal will close the switch 52, in parallel with the switch 113, also resulting in an opening of the advance valve 53. As an important feature of my invention it is also to be noted that the driver may, at any time when the vehicle is in motion, operate the trailer brakes to the extent desired; and this is done merely by rotating the handle 25 in a clockwise direction to in succession, operate the advance valve 53 and the regulator valve 57.

There is thus provided, by my invention, an effective brake mechanism for controlling the tractor and trailer brakes of an automotive vehicle.

Although but one embodiment of my invention has been illustrated and described, various changes in form and relative arrangements of the parts may be made to suit requirements.

I claim:

1. A power braking system for a tractor-trailer combination comprising a brake pedal, a differential air pressure power device for operating the tractor brakes, a differential air pressure power device for operating the trailer brakes, a control valve operatively connected to actuate both of said devices, and control means for actuating said trailer power device with a predetermined pressure ahead of the actuation of said tractor power device without postponing the normal operation of said tractor power device, said control means being regulatable and arranged to hold in reserve for trailer braking purposes a volume of air under a predetermined pressure, the value of this last mentioned air pressure depending upon the pre-regulation of said means, said means including a valve which will release said reserve air for initially operating said trailer power device, and manually operable apparatus, operatively connected to said control valve and said control means, said manually operable apparatus including a hand operated switch for controlling the trailer brake operating means, and brake pedal operating means for controlling the operation of both the tractor and trailer brake operating means.

2. A power braking system for a tractor-trailer combination comprising a brake pedal, a differential air pressure power device for operating the tractor brakes, a differential air pressure power device for operating the trailer brakes, a control valve operatively connected to actuate both of said devices, and means for actuating said trailer power device with a predetermined pressure ahead of the actuation of said tractor power device without postponing the normal operation of said tractor power device, said means being arranged to hold in reserve for trailer braking purposes a volume of air under a predetermined pressure, said means including a valve which will release said reserve air for initially operating said trailer power device, and manually operable controls operatively connected to said control valve and said means, said manually operable controls including a hand operated switch for controlling the trailer brake operating means and brake pedal operated means for controlling the operation of both the tractor and trailer brake operating means.

3. A system providing advance power braking for the trailer of a tractor-trailer combination comprising a manually operable control means for operating the entire tractor-trailer braking system, differential air pressure means arranged to hold in reserve for trailer braking purposes a volume of air under a predetermined pressure, an operator operated regulating device operatively connected to said air pressure means and regulatable to pre-set the aforementioned predetermined air pressure, means operatively connected to said manually operable control for controlling the release of said reserve air for transmission to the trailer portion of the tractor-trailer braking system, and other means operable by the operator and also operable to control the release of said reserve air pressure.

4. A power braking system for a tractor-trailer combination comprising a differential air pressure power device for operating the tractor brakes, a differential air pressure power device for operating the trailer brakes, a control valve operatively connected to actuate both of said devices, and differential air pressure means for actuating said trailer power device with a predetermined pressure ahead of the actuation of said tractor power device without postponing the normal operation of said tractor power device, said means including, as a unit, a power and manually operated three way regulator valve and a power operated advance valve, together with manually operated means for controlling the operation of the two valves.

5. In a tractor-trailer braking system having a power device for operating the trailer brakes, a power device for operating the tractor brakes, a manually operable control member, and a control valve responsive to operation of said control member for controlling the actuation of both tractor and trailer power devices; an advance valve means for actuating said trailer power device ahead of said tractor power device, together with an operator operated regulating valve cooperable with the advance valve to control the advance operation of the trailer brakes, and independently operable means operable at the will of the operator for controlling the operation of the advance valve.

6. In a tractor-trailer braking system having a brake pedal, a power device for operating the tractor brakes, a power device for operating the trailer brakes, pedally operable control means, and a control valve responsive to operation of said control means for controlling the actuation of both tractor and trailer power devices; a source of air under pressure, an advance valve means for actuating said trailer power device ahead of said tractor power device and comprising, as a unit, a chamber for storing a volume of air under pressure, valve means operable to communicate said source with said chamber for causing a predetermined air pressure to be developed in said chamber, and a cut-in valve responsive to operation of said brake pedal for releasing said stored air for operating said trailer power device.

7. In a tractor-trailer braking system having a power device for operating the trailer brakes, a brake pedal and a hand operated mechanism, a power device for operating the tractor brakes, a pedally operable control means, and a control valve responsive to operation of said control means for controlling the actuation of both tractor and trailer power devices; a source of air under pressure, an advance valve means for actuating said trailer power device ahead of said tractor power device and comprising, as a unit, a chamber for storing a volume of air under pressure, a valve responsive to operation of either said control means or the hand operated mechanism for releasing said stored air for operating said trailer power device, and valve means operable to communicate said source with said chamber for establishing and maintaining a predetermined air pressure in said chamber for use in initially applying the trailer brakes.

8. In a tractor-trailer braking system having a power device for operating the trailer brakes, a power device for operating the tractor brakes, a hand operated member, a foot operable control member, and a control valve responsive to operation of said control member for controlling the actuation of both tractor and trailer power devices; a source of air under pressure, valve means for actuating said trailer power device ahead of said tractor power device or independently of said tractor power device comprising an adjustable regulator valve having a chamber for storing a volume of air under pressure, said regulator valve having regulating means operable to communicate said source with said chamber and responsive to adjustment whereby a desired air pressure will be automatically developed in said chamber, and a valve responsive to operation of either said control member or said hand operated member for releasing said stored pressure for operating said trailer power device.

9. In a tractor-trailer braking system having a power device for operating the trailer brakes, a power device for operating the tractor brakes, a foot operable control member, and a control valve responsive to operation of said control member for controlling the actuation of both tractor and trailer power devices; a source of air under pressure, valve means, readily accessible to the driver, for actuating said trailer power device ahead of said tractor power device or independently of said tractor power device comprising a hand operated control means and further comprising an adjustable regulator valve having a chamber for storing a volume of air under pressure, said regulator valve having regulating means operable to communicate said source with said chamber and responsive to adjustment whereby a desired air pressure will be automatically developed in said chamber; and electrical means, including switch means operatively connected to said foot operable control member and to the hand operated control means, for releasing said stored pressure for operating said trailer power device.

10. A control unit adapted to be used as part of a tractor-trailer brake system, said unit including a power and manually operated three way regulator valve, an advance power operated three way cut-in valve, a two part manually operated rotatable means for controlling the operation of said valves, one of the valves being operated when the two parts of said means are rotated together as a unit and the other of said valves being operated when one of the two parts is rotated relative to the other part.

11. A control unit adapted to be used as part of a tractor-trailer brake system, said unit including two three way valves, and means for actuating said valves including two relatively rotatable manually operated members, the parts of said valve actuating mens being so constructed and arranged that rotation of said two members as a unit results in an operation of one of the three way valves and relative rotation of said members results in an operation of the other of said three way valves.

12. A control unit adapted to be used as part of a tractor-trailer brake system, said unit including two three way valves, and means for actuating said valves including two relatively rotatable manually operated members and further including cam means for controlling the rate and degree of movement of parts of one of the three way valves, the parts of said valve actuating means being so constructed and arranged that movement of said two members as a unit results in an operation of one of the three way valves and relative movement of said members results in an operation of the other of said three way valves.

13. A pneumatic control valve comprising, a valve body having a vacuum chamber, an atmospheric chamber, a control pressure chamber, a vacuum port, and a control pressure port; said valve body also having flow passageways connecting said ports to said vacuum chamber and said control pressure chamber; valve means for controlling air flow from said atmospheric chamber to said control pressure chamber, and from said control pressure chamber to said vacuum chamber; a first adjustable control member for adjusting said valve means to provide a predetermined pressure in said control pressure chamber; electrical switch means operatively associated with said first control member; solenoid operated valve means electrically connected to said switch means for controlling flow through said passageways in a manner to communicate said vacuum port with said control pressure port when said switch means is in one position, and to communicate said control pressure chamber with said control pressure port when said switch means is in its other position; and a second adjustable control member movable relative to said first control member for holding said switch means in said one position when said control members are in predetermined relative positions.

14. A pneumatic control valve comprising, a valve body having an internal chamber; a diaphragm in said valve body dividing said chamber into first and second opposed chambers; a first tubular member carried by said diaphragm establishing a flow passage between said opposed chambers; said valve body having a first flow passageway communicating said first opposed chamber with the exterior of said valve, a second flow passageway communicating said second opposed chamber with said first flow passageway, and a third flow passageway communicating said second flow passageway with the exterior of said valve; a first valve port in said second flow passageway between said third flow passageway and said second opposed chamber; a second valve port in said second flow passageway between said first flow passageway and said third flow passageway; a second tubular member extending through said valve body to establish communication between said second opposed chamber and the exterior of said valve, said second tubular member being in line with said first tubular member and having valve means on its end adjacent said first tubular member adapted to close said first tubular member and open said second tubular member when urged against said first tubular member; a first control member rotatably carried by said valve body and adapted to move said second tubular member toward said first tubular member upon rotation of said control member; an electrical conductor member positioned adjacent said control member and insulated from said valve body; an electrical contact member carried by said first control member and spring biased toward said electrical conductor member; a second control member rotatably carried by said valve body and having a portion adapted to separate said electrical contact member from said electrical conductor member when moved between said members; and solenoid operated valve means electrically connected to said conductor member for closing said first port and opening said second port when said portion of said second control member is between said contact member and said conductor member, and for opening said first port and closing said second port when said contact member touches said conductor member.

References Cited in the file of this patent
UNITED STATES PATENTS

| | | |
|---|---|---|
| 1,872,659 | Bragg et al. | Aug. 23, 1932 |
| 2,188,200 | Cox | Jan. 23, 1940 |
| 2,429,194 | Price | Oct. 14, 1947 |
| 2,498,108 | Gunderson | Feb. 21, 1950 |
| 2,569,610 | Ingres | Oct. 2, 1951 |